(No Model.) 2 Sheets—Sheet 1.
D. REYNOLDS.
RUNNING GEAR FOR VEHICLES.
No. 418,224. Patented Dec. 31, 1889.
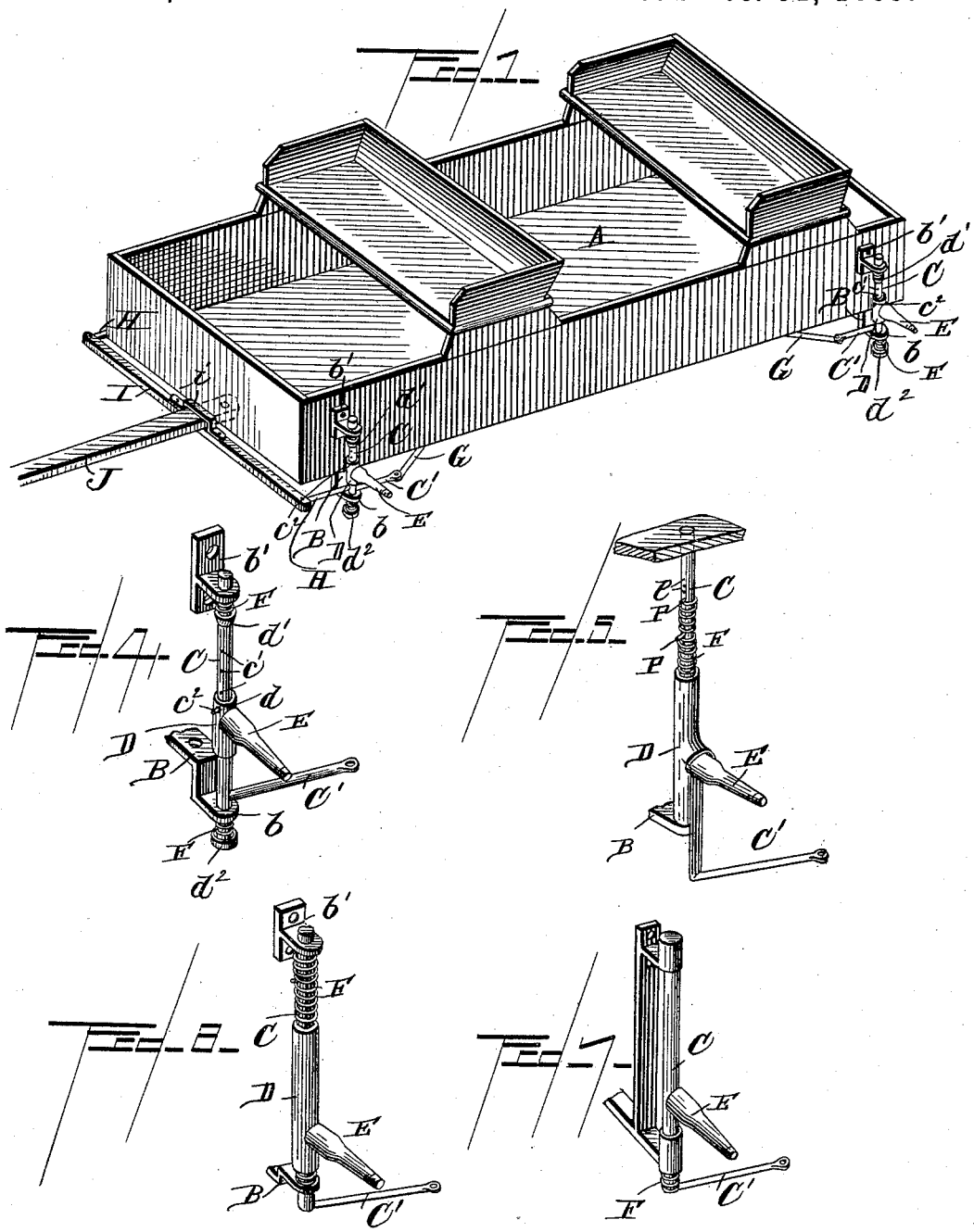
Witnesses
Henry G. Dieterich
Wm. J. Littell
Inventor:
Daniel Reynolds,
By his Attorney
J. R. Littell

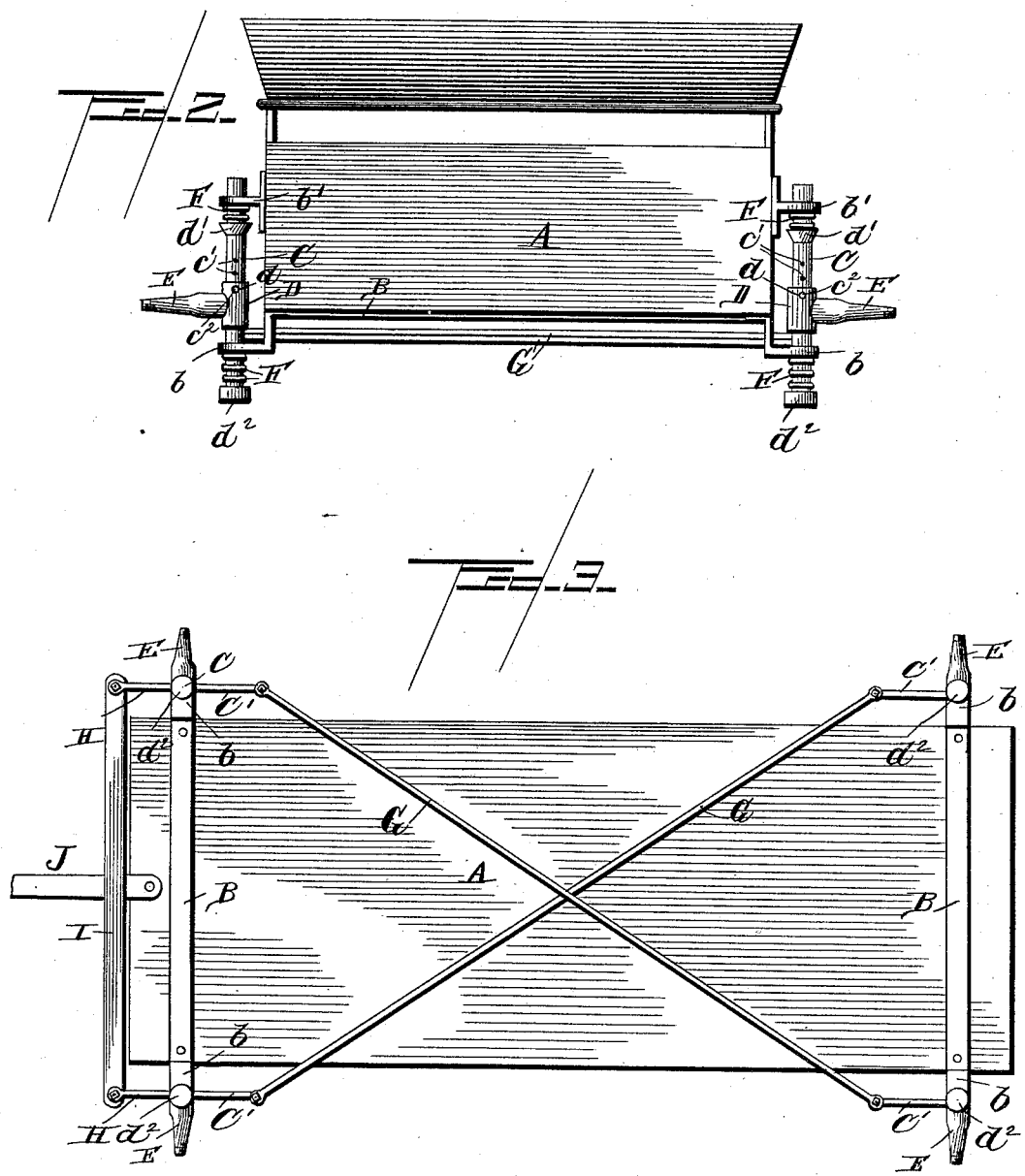

UNITED STATES PATENT OFFICE.

DANIEL REYNOLDS, OF CROTON, OHIO.

RUNNING-GEAR FOR VEHICLES.

SPECIFICATION forming part of Letters Patent No. 418,224, dated December 31, 1889.

Application filed July 13, 1889. Serial No. 317,450. (No model.)

*To all whom it may concern:*

Be it known that I, DANIEL REYNOLDS, a citizen of the United States, residing at Croton, in the county of Licking and State of Ohio, have invented certain new and useful Improvements in Running-Gears for Vehicles, of which the following is a specification.

This invention relates to running-gears for vehicles, and has for its object to provide a simple and improved device of this character which will possess advantages in point of inexpensiveness, durability, and general efficiency.

In the drawings, Figure 1 is a perspective view of a vehicle embodying my invention. Fig. 2 is a rear end elevation. Fig. 3 is a bottom or inverted plan view. Fig. 4 is a detail perspective view of one of the spindles and its supports. Figs. 5, 6, and 7 are similar views of modifications.

Corresponding parts in the figures are denoted by the same letters of reference.

Referring to the drawings, A designates the vehicle-body. (Here shown as the body of a wagon, though it will be obvious that my improved running-gear is equally as well adapted for use in connection with carriages.) Near the front and rear ends of the body are provided cross-pieces B B, which project beyond the sides thereof and form the lower bearings $b$ for vertical rods C, the upper ends of the latter bearing in lugs $b'$, provided for this purpose. The front and rear rods are respectively provided near their lower ends with rearwardly and forwardly projecting rigid arms C', the purpose of which will hereinafter be set forth.

The rods C are cylindrical in form, and loosely mounted thereon between their bearings are sleeves D, provided each with a transverse perforation $d$, coinciding with one of a series of transverse perforations $c'$ in each of the rods C, adapted for the reception of a pin $c^2$ to retain the sleeve in adjusted position and against lateral movement independent of the rod C. From each of the sleeves D projects a spindle E at right angles thereto, upon which is mounted a carrying-wheel. (Not shown.) The rods are each provided with a shoulder $d'$ under the top bearing and with a headed lower end $d^2$, and between the shoulder and top bearing and lower bearing and headed end are disposed coiled springs F F, encircling the rod. The arms C' of the rear rods C are connected at their free ends with the diametrically-opposite arms C' of the front rods C by rods G G, said rods crossing each other at the center.

H H designate horizontal arms projecting forwardly from the front rods C and on the same plane with the rearwardly-projecting arms of the latter, said arms H having their outer ends pivotally connected with the ends of a transverse bar I, located in front of the vehicle. This bar is provided centrally with a yoke or staple $i$, through which is loosely passed the vehicle-tongue J, the latter being pivotally secured to the vehicle in any suitable manner.

The operation and advantages of my invention will be readily understood by those skilled in the art to which it appertains. It will be obvious that as the tongue is turned it throws the bar I to one side, turning the front spindles, while the rear spindles, through the medium of the connecting-rods, are turned in a direction opposite to that of the front spindles.

In the modification illustrated in Fig. 5 the rods C are formed cylindrical and are rigidly mounted. In this construction the arms C' are rigidly connected with the sleeves D, said sleeves being laterally movable upon said rods. Coil-springs F are disposed upon said rods above the sleeves, and the tension of each of these springs is regulated by a pin P engaging one of a series of perforations $p$, provided through the rods C.

In Fig. 6 I have illustrated a construction in which the rods C are formed angular between their bearings and the sleeves provided with corresponding angular eyes, whereby they are vertically but not laterally adjustable on said rods. In this instance the arms C' are rigidly secured to the lower ends of the rods C or formed integral therewith. Upon the rods C, between their bearings and the ends of the sleeves, are preferably disposed coil-springs F.

In some instances the sleeves D may be entirely dispensed with, as in the construction illustrated in Fig. 7, in which event the spindles project directly from the rods C. The arms C' project from the lower ends of these rods, and between said arms and the lower bearings of the rods are disposed coil-springs F.

It will be obvious that further modifications may be made in the construction and arrangement of parts without departing from the spirit and scope of my invention. For instance, the invention can be adapted for a one-horse vehicle by dispensing with the bar I and connecting the thills directly with the arms H. I therefore reserve to myself the right to all such modifications.

I claim as my invention—

1. The combination, with the vehicle-body, of vertical rods disposed at each side of said body, said rods being cylindrical in form and provided with a series of transverse perforations, adjustable sleeves having transverse perforations coinciding with the latter, said perforations being adapted to be engaged by retaining-pins, and a spindle projecting at right angles from each of said sleeves, substantially as and for the purpose set forth.

2. The combination, with a vehicle-body, of pivotally-mounted independent rear spindles, forwardly-projecting arms connected with the latter, pivotally-mounted independent front spindles, forwardly and rearwardly projecting arms connected therewith, rods connecting the diametrically-opposing arms of the front and rear spindles, and connection between the free arms of the front spindles and the draft-tongue or shafts, substantially as set forth.

3. The combination, with a vehicle-body, of vertically-mounted rods at the front and rear ends thereof at each side, carrying wheel spindles disposed on said rods, forwardly-projecting arms connecting a transverse bar with the front spindles, a pivoted tongue adapted to engage said bar, whereby movement of the tongue is imparted to the latter, and connection between the diametrically-opposite front and rear spindles, substantially as set forth.

4. The combination, with a vertical rod provided with a series of transverse perforations, of a sleeve adjustably mounted on said rod and carrying a spindle, said sleeve being provided with oppositely-disposed transverse perforations adapted to register with one of said series of perforations and receive a locking-pin, substantially as set forth.

In testimony whereof I affix my signature in presence of two witnesses.

DANIEL REYNOLDS.

Witnesses:
   THOS. E. WOODS,
   WM. J. LITTELL.